Nov. 7, 1967　　　　A. ISAACSON　　　　3,350,813
ELECTRICALLY POWERED WHEELED TOY VEHICLE
Original Filed Feb. 7, 1964　　　　3 Sheets-Sheet 1

INVENTOR.
ANSON ISAACSON
BY
Amster + Rothstein
ATTORNEYS

Nov. 7, 1967   A. ISAACSON   3,350,813
ELECTRICALLY POWERED WHEELED TOY VEHICLE
Original Filed Feb. 7, 1964   3 Sheets-Sheet 2

INVENTOR.
ANSON ISAACSON
BY Amster + Rothstein
ATTORNEYS

Nov. 7, 1967   A. ISAACSON   3,350,813
ELECTRICALLY POWERED WHEELED TOY VEHICLE
Original Filed Feb. 7, 1964   3 Sheets-Sheet 3

INVENTOR.
ANSON ISAACSON
BY
Amster + Rothstein
ATTORNEYS

United States Patent Office 3,350,813
Patented Nov. 7, 1967

3,350,813
ELECTRICALLY POWERED WHEELED TOY VEHICLE
Anson Isaacson, Great Neck, N.Y., assignor to Ideal Toy Corporation, Hollis, N.Y., a corporation of New York
Continuation of application Ser. No. 343,321, Feb. 7, 1964. This application Sept. 12, 1966, Ser. No. 578,889
3 Claims. (Cl. 46—243)

ABSTRACT OF THE DISCLOSURE

A battery-operated toy vehicle having two pairs of spaced apart battery contacts, one pair being located adjacent the pivotally mounted front wheels of the vehicle and having extending portions thereon functioning as part of each front wheel mounting to prevent inadvertent detachment of the wheels. Additionally, the front battery contacts serve as the on-off switch of the battery energization circuit in cooperation with a movable conductive switch blade movable between an off position and an on position bridging the battery contacts.

---

This application is a continuation of application Ser. No. 343,221, filed Feb. 7, 1964, and since abandoned.

The present invention relates generally to toys, and in particular to a miniature driven wheeled chassis for use with one of a plurality of vehicle bodies.

Small scale or minature replicas of a wide variety of objects has become a subject of interest to both adult and juvenile collectors. Miniature scale models of trains, airplanes, cars, boats and the like are available to those who are interested. Particularly with respect to miniatures of various types of vehicles, it has been suggested that a single universal chassis could be employed for interchangeable assembly with one of a plurality of vehicle bodies which are shaped and ornamented to represent different types of well known cars and trucks. However, such known universal chassis and interchangeable bodies have not achieved any wide spread popularity or notoriety. There exists a need for a driven chassis or undercarriage for a vehicle which can serve as the foundation or building block for a wide variety of vehicle types, which by the simple expedient of removing one vehicle body and replacing the same with another can provide the user with a small scale replica of one of many diverse types of popular vehicles.

Broadly, it is an object of the present invention to provide a wheeled and driven vehicle chassis which realizes one or more of the aforesaid objectives. Specifically, it is within the contemplation of the present invention to provide a chassis for interchangeable assembly with diverse types of vehicle bodies which is motor driven from a self-contained battery source and may be adjusted to follow different courses.

In accordance with an illustrative embodiment demonstrating objects and features of the present invention, there is provided a driven wheeled chassis for interchangeable use with different vehicle bodies which comprises an elongated chassis body having front and rear ends. A front wheel assembly having steerable front wheels is mounted on the chassis body adjacent to the front end thereof. A rear wheel assembly having non-steerable rear wheels is mounted on the chassis body rearwardly of the front wheel assembly. Provision is made on the chassis body intermediate the front and rear wheel assemblies to define a battery cradle which is adapted to receive one or more batteries. Provision is made on the chassis body adjacent the rear end thereof to define a motor cradle which includes two rear mounting and contacting members. A battery-operated motor is received within the motor cradle and has respective input terminals and a motor shaft extending transversely of the chassis body. Provision is made on the rear mounting and contacting members for releasably securing the motor within the motor cradle, with such rear members being electrically conductive and having respective motor and battery contacts for electrically connecting the one or more batteries in an enrgization circuit with the input terminals of the motor. Finally, provision is made for operatively connecting the motor shaft to the rear wheel assembly for imparting drive thereto. The arrangement of the battery and motor cradles and the remaining components of the chassis require to complete both the mechanical and electrical assemblies thereof is such as to facilitate the miniaturization of the chassis and the corresponding line of vehicle bodies to be interchangeably engaged therewith. This effectively enhances the play value and interest of these items in enabling the provision of a relatively small scale line. Further, the construction is such as to permit the ready removal of one or both batteries, the motor, or both for the purpose of replacement and/or to enhance the play value of the line of toys which may be created in accordance with the present invention.

The above brief description, as well as further objects, features and advantages of the present invention will be more fully appreciated by reference to the following detailed description of a presently preferred, but nonetheless illustrative embodiment demonstrating objects and features of the present invention, wherein.

Figure 1:
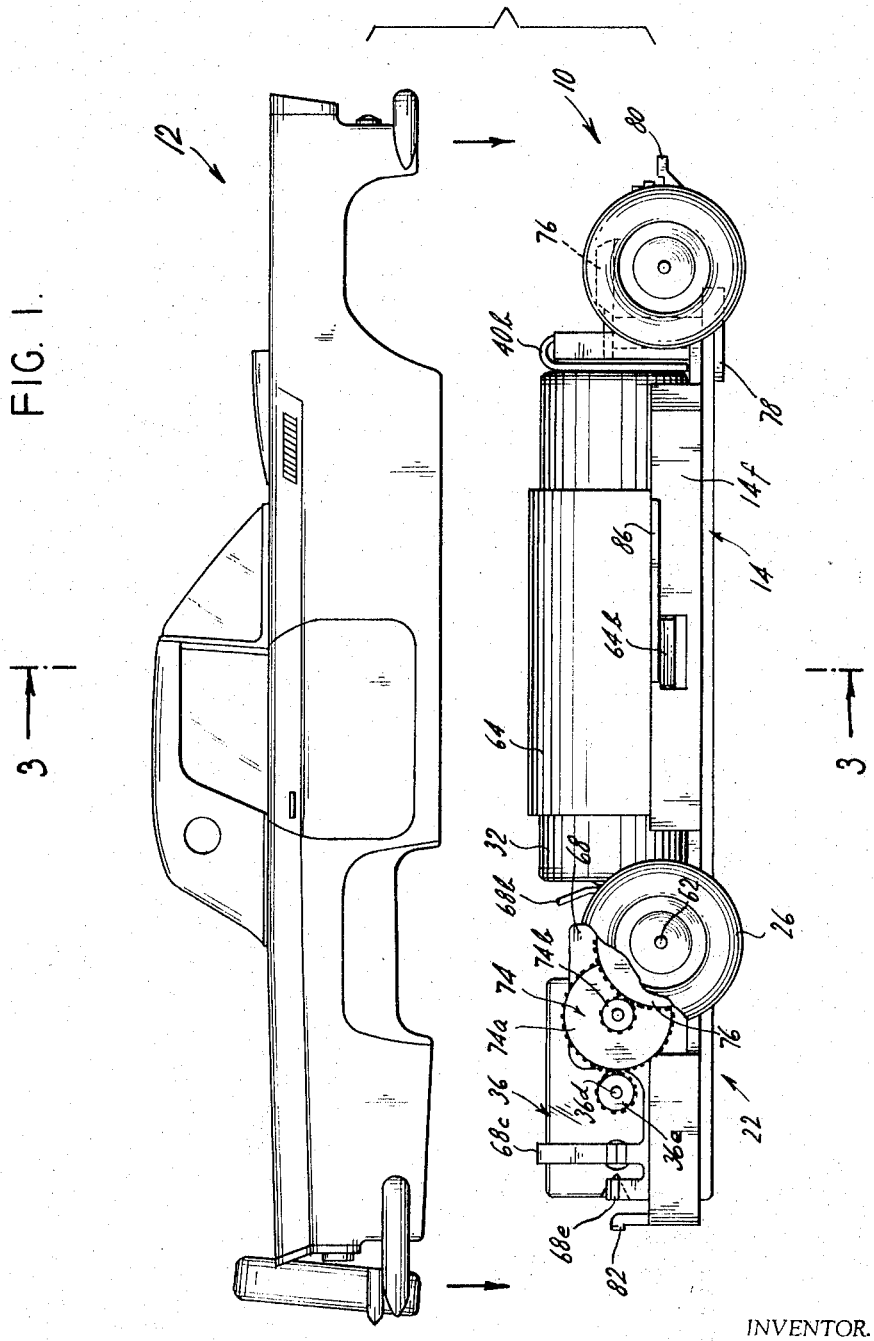
FIG. 1 is an exploded side elevational view, with parts broken away showing a driven wheeled chassis embodying features of the present invention and a typical vehicle body which may be interchangeably assembled therewith.

In the drawings, there is shown a vehicle chassis embodying features of the present invention, generally designated by the reference numeral 10, for interchangeable use with any one of a number of different vehicle bodies, such as the illustrative body 12. The illustrative body 12 is but one of a series which may be detachably secured to the chassis 10, with the design of the body only being limited in the requirement that it accommodate the chassis with the motor and batteries in their corresponding working positions. The scale in the illustrative drawings is approximately twice that contemplated for vehicles embodying features of the present invention. In a typical construction, the overall length of the chassis will be be of the order of inches. Notwithstanding such miniaturization, the chassis 10 will have the necessary functional attributes to enable the provision of a self-contained battery drive and the capability of steering the vehicle while the vehicle body 12 is capable of being ornamented and dressed to provide a small-scale replica having a good likeness to its full scale counterpart.

Figure 2:
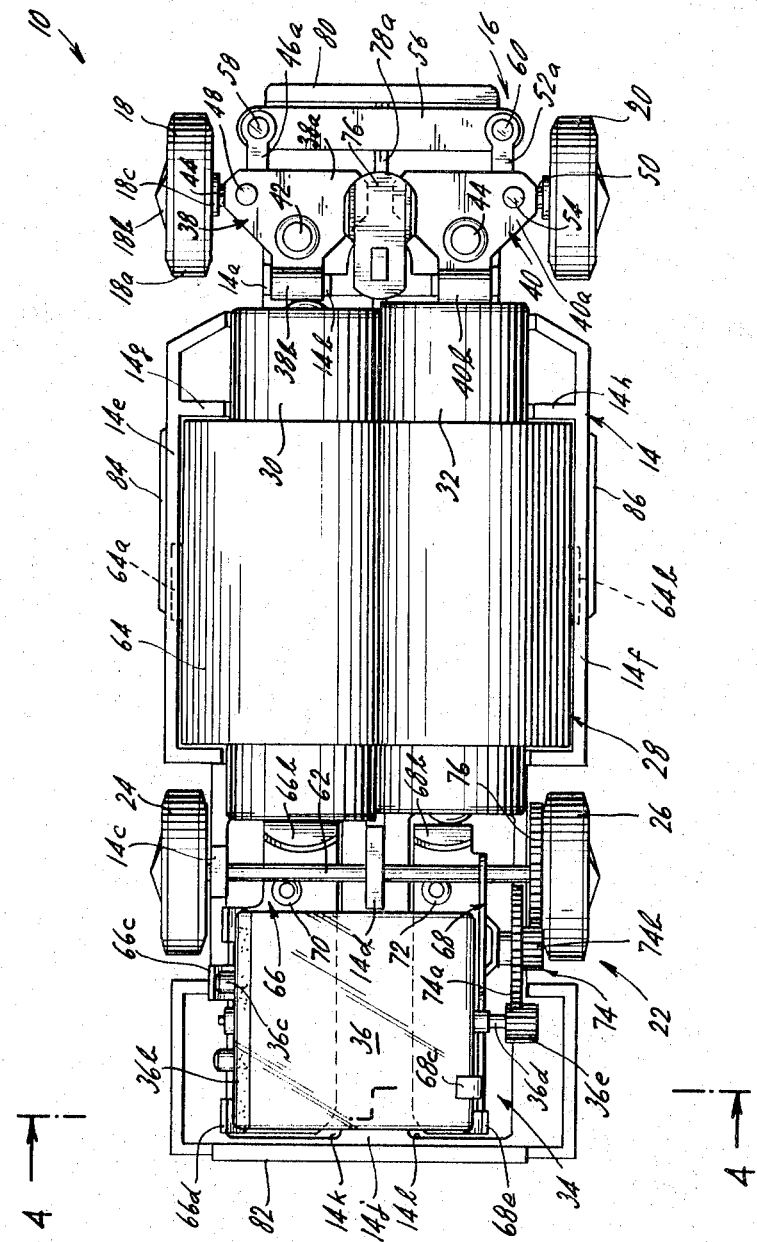
FIG. 2 is a plan view of the driven wheeled chassis, shown with the motor and batteries assembled therewith.

Referring now specifically to FIGS. 1 and 2, the chassis 10 is seen to include an elongated chassis body 14 having front and rear ends. A front wheel assembly, generally designated by the reference numeral 16 and having left and right front steerable wheels 18, 20, is mounted on the chassis body 14 adjacent to the front end thereof. Disposed rearwardly of the front wheel assembly 16 is a rear wheel assembly, generally designated by the reference numeral 22, which includes non-steerable left and right rear wheels 24, 26. The reference throughout the specification to "left" and "right" components is intended to orient such components as viewed from the position of the drive when seated in the vehicle.

Intermediate the front and rear wheel assemblies 16, 22 and in a position corresponding to the main body of the vehicle there is provided a battery cradle, generally designated by the reference numeral 28, which in this illustrative assembly receives side by side batteries, 30, 32 which extend lengthwise of the chassis body 14 and are substantially hidden from view by the vehicle body 12 when assembled with the chassis 10.

Disposed rearwardly of the rear wheel assembly 22 in the trunk region of the vehicle, there is provided a motor cradle, generally designated by the reference numeral 34, which receives a battery-operated miniature motor 36. As will be subsequently described, the motor 36 is operatively connected to the right rear wheel 26 of the rear wheel assembly 22 for imparting drive thereto and is connected in an energization circuit with the batteries 30, 32 which may be selectively completed and disrupted. As the description proceeds and from the foregoing explanation of the general arrangement, it will be appreciated that there is provided an exceptionally compact arrangement lending itself admirably to miniaturization and the facility for removal and replacement of the batteries 30, 32 and the motor 36.

Figure 5:
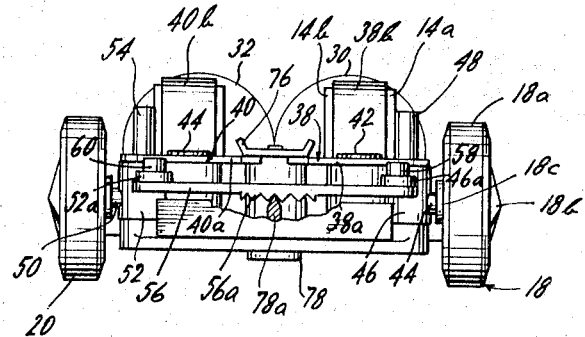
FIG. 5 is a front elevational view of the chassis taken from the right of FIG. 2; and, FIG. 6 is a schematic diagram showing the energization circuit for the battery-operated motor incorporated in the instant chassis.

As seen best in FIGS. 1, 2 and 5, the front wheel assembly 16 includes left and right front mounting and contacting members 38, 40 which are of identical construction, and are fabricated of an electrically conductive material, such as bronze stampings. The left front mounting and contacting member 38 includes a planar base 38a which rests against and is secured to the underlying portion of the chassis body 14 and is secured thereto as by rivet 42. The member 38 further includes an upstanding resilient left front battery contact 38b which is positioned at the corresponding forward end of the battery cradle 28 in position to engage the center terminal of the battery 30. Similarly, the right front mounting and contacting member 40 is secured to the chassis body 14 by rivet 44 and includes a planar base 40a and an upstanding resilient right front battery contact 40b located at the corresponding forward end of the battery cradle 28 in position to contact the casing of the battery 32. In order to laterally confine the contacts 38b, 40b and to assure that such contacts will only move lengthwise of the chassis 10, the chassis body 14 is provided with upstanding contact-bracing ribs, such as the ribs 14a, 14b associated with the contact 38b which contribute to the structural stability of the construction and preclude the possibility of the respective members 38, 40 rotating about the rivets 42, 44.

The left front wheel 18 of the front wheel assembly 16 is journalled on a left front axle 44 which extends horizontally and is suspended on a knuckle 46 journalled on a left front king pin 48. Thus, the wheel 18 is capable of rotating about its corresponding horizontal wheel axis which may be turned about the vertical steering axis defined by the king pin 48. Similarly, the right front wheel 20 is journalled on a right front axle 50 which is secured to a right front knuckle 52 journalled on a right front king pin 54. Provision is made for coordinating the front wheels 18, 20 for adjustment about the steering axes defined by the king pins 48, 54 so that the vehicle may take different courses as set by the user. Specifically, the knuckles 46, 52 have respective knuckle arms 46a, 52a which are interconnected by a tie rod 56 extending transversely of the chassis body 14 across the front end thereof. One end of the tie rod 56 is connected to the knuckle arm 46a by tie rod pin 58 and the other end of the tie rod 56 is connected to the knuckle arm 52 by tie rod pin 60. Thus, by grasping either of the front wheels 18, 20 and simultaneously adjusting the attitude of the wheels 18, 20 in relation to the chassis body, it is possible to have the vehicle go forwardly, traverse a course to the left, or traverse a course to the right.

The wheels 18, 20 of the front wheel assembly 16 and the wheels 24, 26 of the rear wheel assembly 22 are all substantially identical in construction. Thus it will suffice to describe only one of the wheels in detail. For example, the wheel 18 includes a tire 18a, as of molded rubber, and appropriate ornamental wheel disc 18b which may be removably mounted within the tire 18a, and a wheel hub 18c which may be removably engaged within the tire 18a and is arranged to accommodate the corresponding axle 44. The construction is such to enable the wheels to be dismantled and reassembled by the user.

Figure 4:
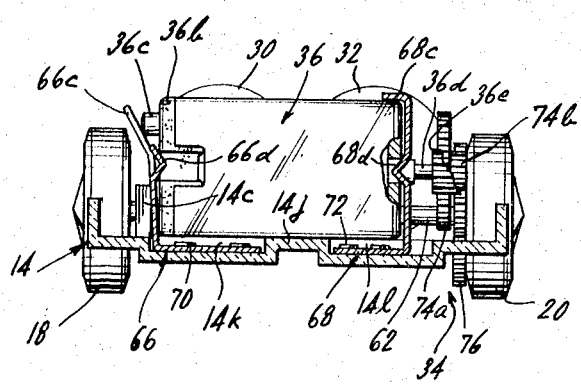
FIG. 4 is a sectional view taken substantially along the line 4—4 of FIG. 2 and looking in the direction of the arrows, showing details of the construction of the motor cradle.

The rear wheel assembly 22 includes a rear axle 62 which extends transversely of the chassis body 14 intermediate the battery cradle 28 and the motor cradle 44. The axle 62 is retained on the chassis by integral bearings or journals, such as designated by the reference numerals 14c and 14d and as seen in FIGS. 2 and 4. The left and rear wheels 24, 26 are journalled on the rear axle 62, with at least the right rear wheel 26 being arranged to free-wheel.

Figure 3:
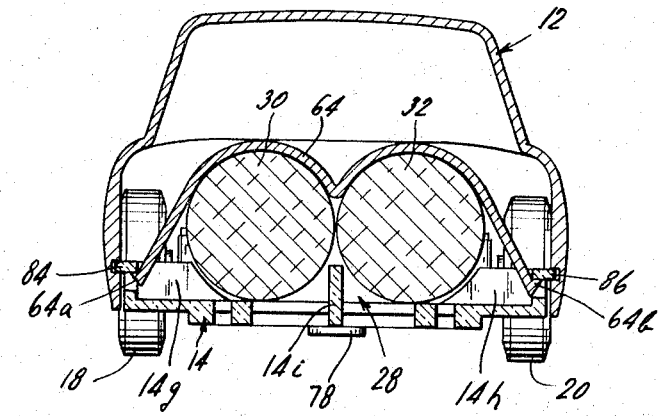
FIG. 3 is a sectional view taken substantially along the line 3—3 of FIG. 1 and looking in the direction of the arrows, showing details of the construction of the battery cradle.

The battery cradle 28, details of which were seen best in FIGS. 1 to 3 inclusive, is defined by flanges molded integrally with the chassis body 14 including a left marginal flange 14e, a right marginal flange 14f and plural pairs of opposed transverse flanges, such as flanges 14g, 14h. The transverse flanges are appropriately cut away, as seen best in FIG. 3, to conform generally to the outline of the batteries, 30, 32 when placed within the cradle 28. With continued reference to FIG. 3, it will be seen that the chassis body 14 is provided with a central longitudinally extending reinforcing rib 14i which medially partitions the battery cradle 28 into two side by side compartments adapted to receive the batteries 30, 32. The batteries 30, 32 are releasably secured in the battery cradle 28 by a battery hold-down clip 64 which may be fabricated of any appropriate materials such as molded plastic and is shaped generally to conform to the batteries when seated within the cradle 28. The clip 64 is formed with clip ears 64a, 64b at the opposite ends thereof which are received within appropriate cut-outs formed in the longitudinally extending marginal flanges 14e, 14f.

The details of the motor cradle 34, 36 may be best appreciated by reference to FIGS. 1, 2 and 4. The motor cradle 34 includes a platform 14j formed integrally with the chassis body 14 and extending medially thereof which supports the motor 36 intermediate the ends thereof, as seen in FIG. 4. At the opposite sides of the platform 14j, the chassis body 14 is formed with longitudinally extending wells 14k, 14l which are of an extent to accommodate left and right rear mounting and contacting members 66, 68 which are fabricated of electrically conducted material, preferably bronze stampings. The members 66, 68 serve to releasably secure the motor 36 to the chassis, are part of the motor cradle 34, orient the motor 36 relative to the rear wheel assembly 22 to establish drive thereto, and establish electrical connections between the batteries 30, 32 and the motor 36, as will be described hereinafter.

The motor 36 is of the fractional horsepower battery-operated type and is of generally known construction. Such motors are commercially available from a number of sources and include a conductive casing 36a serving as one input terminal thereof, an insulated end wall 36b, an input terminal 36c extending from the insulating wall 36b and coacting with the conductive casing 36a to complete the energization circuit for the motor, a motor shaft 36d projecting from the casing 36a at the side remote from the insulating wall 36b, and a shaft gear 36e secured to the motor shaft 36d. The motor 36 is received within the trunk counterpart of the full scale vehicle and may be readily removed for replacement, repair or during play. Since the internal construction of the motor is generally well known and is subject to a latitude of modification, change and substitution, further description of the motor will be dispensed with in the interest of brevity.

Reverting back to the left and right rear mounting and contacting members, the left rear contacting member 66 is seen to include a base 66a secured within the well 14k of the chassis body 14 by rivets 70 (see FIG. 4) and formed at its forward end with an integral, upstanding resilient battery contact 66b. The battery contact 66b is disposed in spaced end to end relation with the battery contact 38b and is adaped to engage the casing or opposite pole of the battery 30. Similarly, the right rear mounting and contacting member 68 includes a base 68a lying within the well 14l and secured therein as by one or more rivets 72 and terminates at its forward end in an upstanding integral, resilient battery contact 68b. The battery contact 68b is disposed in spaced end to end relation with the battery contact 40b and engages the central terminal or pole of the battery 32. The member 66 is further formed with an upstanding resilient terminal contact 66c which is adapted to engage the input terminal 36c projecting from the insulating wall 36b of the motor 36. Similarly, the member 68 is formed with a combined hold down clip and contact 68c which is releasably engaged over the casing 36a to hold the motor in place and to complete an electrical contact to the casing 36a serving as the other input terminal to the motor 36. Additionally provision is made for orienting the motor 36 in the motor cradle 34 to assure proper meshing of the motor gear 36e with the gear train connected to the rear wheel 26 and to hold the motor within the cradle against the vibrational and displacing forces developed incident to normal usage. To this end, the member 66 is formed with a positioning clip 66d terminating in a detent accommodated in the cut-out formed in the adjacent end of the motor 36. The hold down clip and contact 66c is formed with a detent 68d intermediate the ends thereof which is likewise received within a cut-out formed in the motor. If necessary, the holding forces may be further supplemented by the provision of an auxiliary retaining clip 68e (see FIGS. 1 and 2) which includes a detent received within the cut-out in the adjacent corner of the motor 36.

The driving train from the motor 36 to the right rear wheel 26 is completed by the provision of an idler assembly 74 which is journalled on the member 68 and includes a large diameter gear 74a which is in meshing engagement with the shaft gear 36e and a small diameter gear 74b which is in meshing engagement with a wheel gear 76 secured to the rear wheel 26 inwardly thereof. The gears 36e and 74b are of relatively wide width as compared to their meshing counterparts such that a driving train will be completed notwithstanding a certain degree of side to side displacement of the motor 36 relative to the rear wheel assembly 22 as may be encountered incident to normal manufacturing tolerances.

Figure 6:
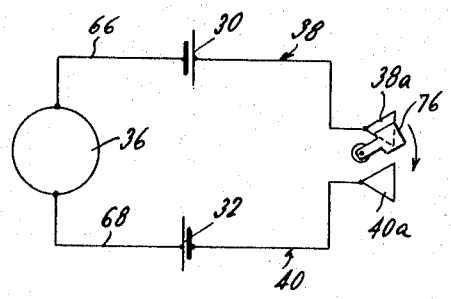

A manually controlled switch is provided for selectively completing and interrupting the enegization circuit for the battery-operated motor 36. In this illustrative embodiment, the front wheel assembly 16 includes a conductive switch blade 76 which overlies the conductive bases 38a, 40a of the front mounting and contacting members 38, 40. The switch blade 76 is secured to an appropriate blade actuator 78 which is journalled on the chassis body 14 and terminates in a head at the underside of the chassis body at a location readily accessible for manipulation. An appropriate detent locking arrangement, such as shown in FIG. 5, may be associated with the blade 76 and the blade actuator 78 to hold the same in its position straddling the bases 38a, 40a to complete the electrical circuit or out of contact with one of the other bases to disrupt the energization circuit. In this embodiment, the underside of the tie-rod 56 is formed with plural teeth 56a which are engaged by a positioning finger 78a formed integrally with the blade actuator 78. As seen in FIG. 6, the energization circuit for the motor 36 includes the batteries 30, 32 connected in series with the input terminals of the motor 36, with the circuit being selectively completed and interrupted by the switch blade 76 which may be brought into straddling relation with respect to the contacts 38a, 40a upon manual manipulation of the actuator 78.

Various expedients may be employed for releasably securing the vehicle body 12 to the chassis 10 to customize the chassis in accordance with the particular design of the vehicle body 12. In this illustrative embodiment, the chassis 10 is provided with an integral front body-engaging lug 80 adapted to be received in a corresponding recess contiguous to the front bumper of the vehicle 12, a rear body-engaging lug 82 adapted to be received in a corresponding recess formed in the vehicle body contiguous to the rear bumper thereof, and respective left and right body-engaging lugs 84, 86 width are adapted to be received in corresponding recesses or cut-outs formed in the opposite sides of the vehicle body, as seen in FIG. 3. The vehicle body 12 itself is fabricated of an appropriate plastic, and accordingly may be flexed to afford a snap interfit with the corresponding lugs 80, 82, 84, 86 on the chassis 10. As previously indicated, the vehicle body is subject to a latitude of modification and change in its construction and may be fabricated to accurately simulate a full size vehicle, with the main body portion being of plastic and having detailing corresponding to the intended vehicle, with windows fabricated of transparent plastic, and with various fittings (i.e. bumpers, ornamentations, door handles, and the like) being of appropriate chrome-plated metal and being permanently or detachably secured to the vehicle body.

In actual use, it is but a simple matter to place the batteries 30, 32 into the battery cradle 28 and engage the clip 64 thereover to secure the batteries in engagement with the respective battery contacts 38b, 40b, 66b and 68b. This is preferably done with the switch 76 in the open position. Thereupon, the motor 36 is engaged within the motor cradle 34, care being taken to assure that the motor is properly positioned relative to the cradle and with the provision of electrical connections between the casing 36a and the contact 60c and the insulated input terminal 36c and its corresponding contact 36c. It should be noted as may be appreciated by inspecting FIG. 4 that the combined mounting and contacting member 66 is completely insulated from the casing 36a of the motor 36. The vehicle chassis is then customized in accordance with the user's wishes by selecting the appropriate vehicle body and releasably engaging the same with the chassis. The thus customized vehicle is ready for use and may be placed into operation by manipulation of the switch actuator 78 from the underside of the chassis, with the user establishing the desired course for the vehicle by grasping one or the other of the front wheels 18, 20 and adjusting the front wheel assembly 16

From the foregoing, it will be appreciated that there has been provided in accordance with the present invention an exceptionally compact and rugged chassis for universal engagement with different vehicle bodies. Relatively few number of parts are employed in constructing the chassis including a body of an appropriate molded plastic, such as a styrene, and stamped metallic parts, such as the members 38, 40, 66, 68 secured to the body by the simple expedient of riveting. In many instances a single stamping or piece serves a number of functions in the mechanical construction and the electrical circuitry. Thus, the chassis may be made on a mass production basis at relatively low unit cost.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A toy comprising a driven wheeled chassis adapted for interchangeable assembly with one of a plurality of vehicle bodies comprising an elongated chassis body, a front wheel assembly mounted adjacent the front end of said chassis body, a rear wheel assembly mounted rearwardly of said front wheel assembly on said chassis body, means on said chassis body intermediate said front and rear wheel assemblies defining a battery cradle for two dry cell batteries, means on said chassis body rearwardly of said rear wheel assembly defining a motor cradle, a battery-operated motor mounted in said motor cradle and including a motor shaft, means operatively connecting said motor shaft to said rear wheel assembly, an energization circuit for said motor including at least two battery contacts secured to said chassis body and spaced adjacent to each other to serve as contacts of a switch, and a manually operable switch means mounted on said chassis body for movement into and out of a circuit-completing position relative to said battery contacts, said switch means including a movable electrically conductive switch blade bridging said battery contacts in said circuit-completing position and a blade actuator accessible at the underside of said chassis body and operatively connected to said switch blade for moving the switch blade into and out of said circuit-completing position.

2. A toy comprising a driven wheeled chassis adapted for interchangeable assembly with one of a plurality of vehicle bodies comprising an elongated chassis body, a front wheel assembly including a left and a right wheel mounted adjacent the front end of said chassis body, a rear wheel assembly mounted rearwardly of said front wheel assembly on said chassis body, means on said chassis body intermediate said front and rear wheel assemblies defining a battery cradle for two dry cell batteries, means on said chassis body rearwardly of said rear wheel assembly defining a motor cradle, a battery-operated motor removably mounted in said motor cradle and including a motor shaft, means operatively connecting said motor shaft to said rear wheel assembly, and means for completing an energization circuit for said motor including a pair of spaced battery contacts secured to said chassis body and positioned in relation to said battery cradle to engage the said batteries, said front wheel assembly including means defining a pivot axis for each said wheel, each said wheel being operatively mounted on said pivot axis defining means such that said wheel is pivotally movable thereabout relative to said chassis body, and each said battery contact has means cooperating with each said pivot axis defining means to prevent inadvertent disengagement of said wheel from said pivot axis defining means.

3. A toy comprising a driven wheeled chassis adapted for interchangeable assembly with one of a plurality of vehicle bodies including an elongated chassis body, a front wheel assembly mounted adjacent the front end of said chassis body, a rear wheel assembly mounted rearwardly of said front wheel assembly on said chassis body, means on said chassis body intermediate said front and rear wheel assemblies defining a battery cradle for two dry cell batteries, means on said chassis body rearwardly of said rear wheel assembly defining a motor cradle, a battery-operated motor mounted in said motor cradle, and an energization circuit for said motor including at least two battery contacts secured to said chassis body and spaced relative to each other, said front wheel assembly comprising a left and a right wheel, pin means on said chassis body operatively adapted to receive said left and right wheels thereon for mounting said wheels for pivotal movement relative to said chassis body, said spaced battery contacts having means extending to positions adjacent said pin means and respectively operatively associated therewith to prevent inadvertent disengagement of said wheels from said pin means.

References Cited

UNITED STATES PATENTS

| | | | |
|---|---|---|---|
| 3,027,682 | 4/1962 | Schlau | 46—244 X |
| 3,102,363 | 9/1963 | Ferriot | 46—244 |
| 3,163,123 | 12/1964 | Ziroli | 46—243 X |

LOUIS G. MANCENE, *Primary Examiner.*

DELBERT B. LOWE, F. BARRY SHAY, *Examiners.*

R. F. CUTTING, *Assistant Examiner.*